(12) United States Patent
Claus et al.

(10) Patent No.: US 9,709,088 B2
(45) Date of Patent: Jul. 18, 2017

(54) METHOD FOR MANUFACTURING A RADIAL AND AXIAL COMBINATION BEARING AND RESULTING BEARING

(71) Applicant: Schaeffler Technologies AG & Co. KG, Herzogenaurach (DE)

(72) Inventors: Seth Claus, Charlotte, NC (US); James Kevin Brown, Rock Hill, SC (US); Dennis Roffe, Fort Mill, SC (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/818,400

(22) Filed: Aug. 5, 2015

(65) Prior Publication Data

US 2016/0084300 A1 Mar. 24, 2016

Related U.S. Application Data

(60) Provisional application No. 62/053,379, filed on Sep. 22, 2014.

(51) Int. Cl.
| | |
|---|---|
| F16C 19/54 | (2006.01) |
| F16C 19/38 | (2006.01) |
| F16C 43/04 | (2006.01) |
| C21D 9/40 | (2006.01) |
| F16C 33/58 | (2006.01) |
| F16C 33/60 | (2006.01) |

(52) U.S. Cl.
CPC ............. *F16C 19/381* (2013.01); *C21D 9/40* (2013.01); *F16C 33/588* (2013.01); *F16C 33/60* (2013.01); *F16C 43/04* (2013.01); *F16C 2361/61* (2013.01)

(58) Field of Classification Search
CPC ........ F16C 19/14; F16C 19/18; F16C 19/188; F16C 19/34; F16C 19/38; F16C 19/381; F16C 19/48; F16C 19/544; F16C 43/04; C21D 9/40
USPC .................................................. 384/452–455
See application file for complete search history.

(56) References Cited

U.S. PATENT DOCUMENTS

| 3,504,955 A * | 4/1970 | Bailey ..................... F16C 27/04 |
| | | 384/535 |
| 3,829,181 A * | 8/1974 | Gunther .................. F16C 19/30 |
| | | 384/455 |
| 3,930,692 A * | 1/1976 | Condon, Jr. ............ F16C 19/30 |
| | | 384/455 |
| 2008/0298734 A1* | 12/2008 | Oishi ...................... F16C 19/46 |
| | | 384/565 |

FOREIGN PATENT DOCUMENTS

FR 2144237 * 2/1973

* cited by examiner

*Primary Examiner* — James Pilkington
(74) *Attorney, Agent, or Firm* — Volpe and Koenig, P.C.

(57) ABSTRACT

An axial and radial combined load rolling bearing including a separately formed radial bearing ring and an axial bearing cup that are assembled together to form the combined load bearing in a simplified manner that avoids known issues with perpendicularity between the radial and axial bearing races. A method of making such a bearing is also provided.

11 Claims, 1 Drawing Sheet

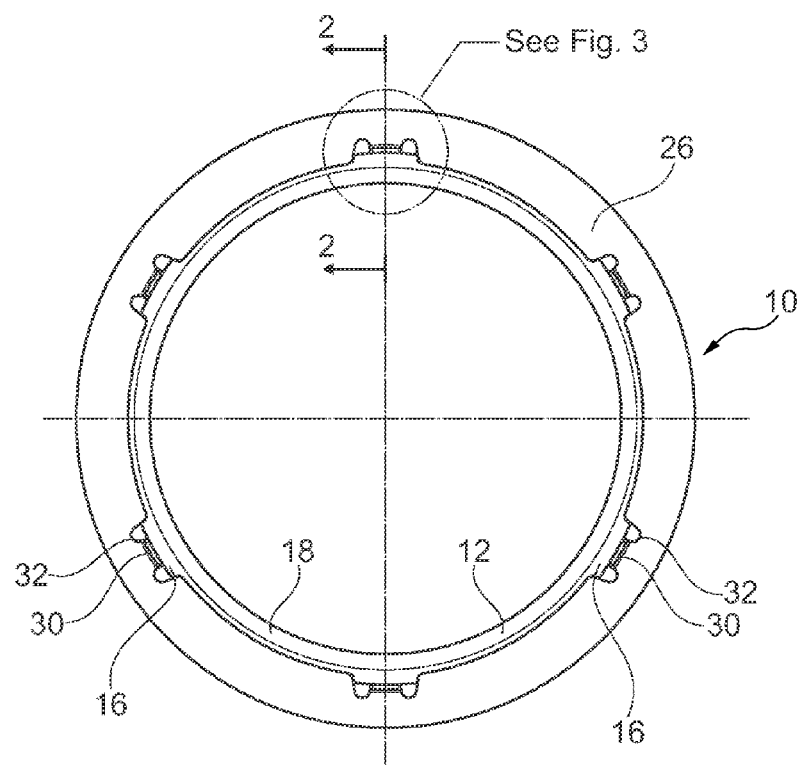
Fig. 1
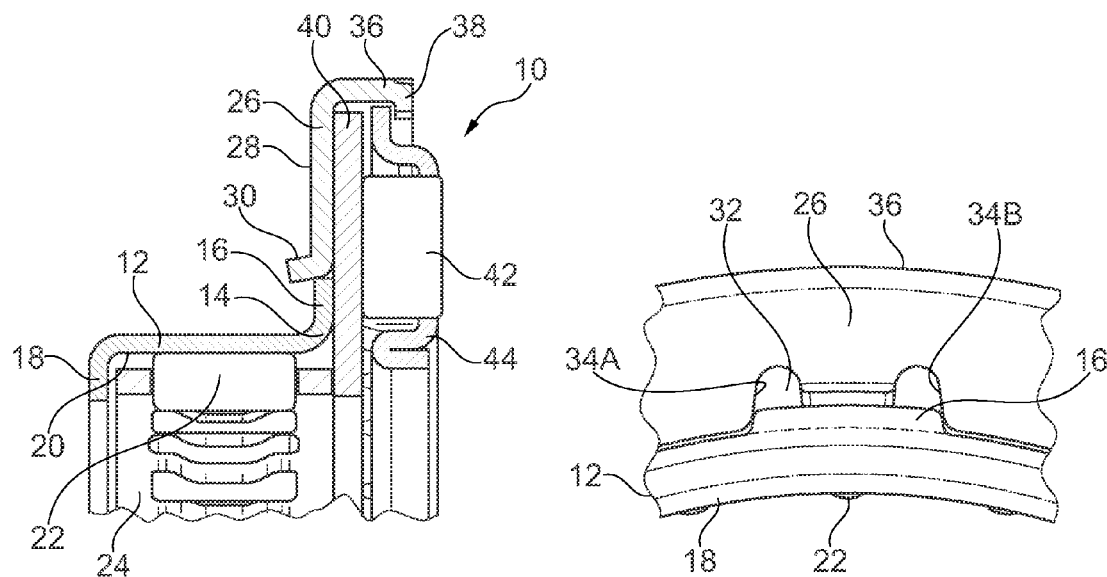
Fig. 2
Fig. 3

METHOD FOR MANUFACTURING A RADIAL AND AXIAL COMBINATION BEARING AND RESULTING BEARING

INCORPORATION BY REFERENCE

The following documents are incorporated herein by reference as if fully set forth: U.S. Provisional Patent Application No. 62/053,379, filed Sep. 22, 2014.

FIELD OF INVENTION

This application is generally related to rolling bearings and more particularly related to combined load rolling bearings and methods of manufacture.

BACKGROUND

Rolling bearings are widely used in various mechanical applications. Combined load rolling bearings can include separately arranged axial rollers and radial rollers which are capable of supporting both radial and axial loads from a rotating part, and are commonly used in automotive transmissions as well as other applications.

In some known prior art combined load roller bearings, this requires the formation of a drawn cup with extensive press tooling in order to form radial and axial sections upon which the separate sets of bearing rollers travel. Here, it is difficult to control the perpendicularity between the radial and axial sections, resulting in edge loading of the axial rollers which can result in premature failure of the bearing due to spalling.

It is desirable to simplify the manufacture of the bearing ring parts as well as to increase the bearing life of radial and axial combination bearings.

SUMMARY

In one embodiment, a combined load rolling bearing is provided having: a radial bearing ring with a circumferentially extending race, an outwardly extending axial flange with outwardly directed anti-rotation projections, and an inwardly extending flange; and an axial bearing cup with an axial body having ring retention tabs spaced about an inner periphery located in notched sections, and an outer radial flange having radially inwardly directed cage retention tabs. The radial bearing ring is located in the axial bearing cup with the anti-rotation projections being located in the notched sections. A cage with radial rollers is located in the radial bearing ring, with the radial rollers contacting the circumferentially extending outer race. An intermediate washer that forms an axial race is located in the axial bearing cup. A second cage with axial rollers is located in the axial bearing cup, with the axial rollers contacting the intermediate washer, and the cage being retained by the radially inwardly directed cage retention tabs.

In another aspect, the radial bearing ring and the axial bearing cup are pressed (stamped or deep drawn) sheet metal parts.

In another preferred aspect, the axial flange of the radial bearing ring is aligned with the axial body of the axial bearing cup. Preferably, the notched sections include end walls that contact the anti-rotation projections.

In another embodiment, a method of manufacturing a radial and axial combination bearing is provided, and includes the steps of:

Forming a radial bearing ring having a circumferentially extending outer race, an outwardly extending axial flange with outwardly directed anti-rotation projections, and an inwardly extending flange;

Forming an axial bearing cup with an axial body having ring retention tabs spaced about an inner periphery located in notched sections, and an outer radial flange having radially inwardly directed cage retention tabs;

Installing the radial bearing ring into the axial bearing cup with the anti-rotation projections being located in the notched sections;

Installing a cage with radial rollers in the radial bearing ring, the radial rollers contacting the circumferentially extending race;

Installing an intermediate washer that forms an axial race in the axial bearing cup; and Installing a second cage with axial rollers in the axial bearing cup, the axial rollers contacting the intermediate washer, and the cage being retained by the radially inwardly directed cage retention tabs.

Additional preferred arrangements of the bearing and the manufacturing method with one or more features of the invention are described below and in the claims.

BRIEF DESCRIPTION OF THE DRAWINGS

The foregoing Summary as well as the following Detailed Description will be best understood when read in conjunction with the appended drawings. In the drawings:

FIG. 1 is a plan view of a combined load rolling bearing according to the invention.

FIG. 2 is a cross-sectional view taken along line 2-2 in FIG. 1.

FIG. 3 is an enlarged detail view taken from the area indicated in FIG. 1 to show an anti-rotation feature of the assembled radial bearing ring and axial bearing cup.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

FIGS. 1-3 show a preferred embodiment of a combined load rolling bearing 10 ("bearing 10") according to the present invention. As shown in FIG. 2, the bearing 10 includes a radial bearing ring 12 having a circumferentially extending outer race 20 on an inner surface thereof. An outwardly extending axial flange 14 extends radially outwardly and includes radially outwardly directed anti-rotation projections 16. Preferably there are at least two of the anti-rotation projections 16, and more preferably at least three of the anti-rotation projections 16. In the preferred embodiment illustrated, there are 6 of the anti-rotation projections 16 that are equally spaced in a circumferential direction. However, the spacing as well as the number of anti-rotation projections 16 can be varied. The radial bearing ring 12 also includes an inwardly extending flange 18 which serves to retain a preferably pre-assembled roller element assembly which includes a cage 24 with radial rollers 22 located in pockets of the cage 24. The radial rollers 22 contact the outer race 20 and are used to carry radial loads. The radial rollers 22 define an inner peripheral surface that is adapted to contact a shaft or other rotating element that is being supported that includes or defines the inner race (not shown).

The radial bearing ring 12 is preferably formed by pressing (stamping or deep drawing) in one piece including the outwardly extending axial flange 14, anti-rotation projections 16, as well as the inwardly extending flange 18, and is preferably formed from a bearing grade steel provided as a metal sheet that is pressed into the final configuration of the radial bearing ring 12. The cage 24 can be made of metal or a polymeric material. The rollers 22 are preferably also made of bearing grade steel.

Still with reference to FIG. 2, an axial bearing cup 26 is shown having an axial body 28 with ring retention tabs 30 spaced about an inner periphery thereof located in notched sections 32. The notched sections 32 include end walls 34A, 34B which, as shown in detail in FIGS. 1 and 3, contact the anti-rotation projections 16 of the radial bearing ring 12 when the radial bearing ring 12 is assembled with the axial bearing cup 26. Here, the anti-rotation projections 16 are located in the notched sections 32 with the axial flange 14 of the radial bearing ring 12 aligned with the axial body 28 of the axial bearing cup 26. This ensures that the radial bearing ring 12 cannot rotate relative to the axial bearing cup 26. The axial bearing cup 26 also includes an outer radial flange 36 having radially inwardly directed cage retention tabs 38.

The axial bearing cup 26 is preferably also formed as a pressed part (by stamping or deep drawing) and formed from a sheet metal blank made from steel. The notched sections 32 as well as the ring retention tabs 30 and cage retention tabs 38 are formed during the pressing process.

Referring again to FIG. 2, an intermediate washer 40 that forms an axial race is located in the axial bearing cup 26. The intermediate washer is preferably made of bearing grade steel. A second cage 44 with axial rollers 42 that are designed to carry an axial load are located in the axial bearing cup 26. The axial rollers 42 contact the intermediate washer 40. The second cage 44 and axial rollers 42 are preferably also pre-assembled and installed as a unit in the axial bearing cup 26. The cage 44 is retained by the radially inwardly directed cage retention tabs 38 that extend from the radial flange 36 of the axial bearing cup 26.

The second cage 44 can be made of metal or a polymeric material. The axial rollers 42 are also formed of bearing grade steel.

In a preferred method of manufacturing the radial and axial combination bearing 10, after forming the radial bearing ring 12 and the axial bearing cup 26 by pressing from a sheet metal blank, specifically a sheet metal blank made of bearing grade steel, the radial bearing ring 12 and the axial bearing cup 26 are heat treated and tempered. Optionally, a surface finish or polishing can then take place, for example by placing the heat treated and tempered parts into a vibrating bin with polishing elements, such as ceramic chips. The completed detail parts are then assembled by installing the radial bearing ring 12 into the axial bearing cup 26 with the anti-rotation projections 16 located in the notched sections 32. The cage 24 with the radial rollers 22 is installed in the radial bearing ring 12 with the radial rollers 22 contacting the circumferentially extending outer race 20. The intermediate washer 40 is then installed in the axial bearing cup 26 and forms the axial race. The second cage 44 with the axial rollers 42 is then installed in the axial bearing cup 26, with the axial rollers 42 contacting the intermediate washer 40. The cage 44 is retained by the radially inwardly directed cage retention tabs 38 formed in the axial bearing cup 26.

Using this arrangement, the issues with the known prior art single piece bearing cups that include both the radial and axial races which are difficult to maintain perpendicular to one another during the formation process is avoided. Additionally, the tooling required for pressing both the radial bearing ring 12 and the axial bearing cup 26 is significantly less complicated than the tooling required for production of a single piece part. Thus, the bearing 10 according to the invention provides an arrangement that requires less re-work and results in less defects during manufacture.

Having thus described various embodiments of the present combined load rolling bearing in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LIST OF REFERENCE NUMBERS

10 Combined Load Rolling Bearing
12 Radial Bearing Ring
14 Outwardly Extending Axial Flange
16 Anti-rotation Projections
18 Inwardly extending flange
20 Outer Race
22 Radial rollers
24 Cage
26 Axial Bearing Cup
28 Axial body
30 Ring Retention Tab
32 Notched Sections
34A, B End wall of Notched Sections
36 Radial Flange
38 Cage Retention Tab
40 Intermediate Washer
42 Axial Rollers
44 Cage

What is claimed is:

1. A method of manufacturing a radial and axial combination bearing, comprising:
    forming a radial bearing ring having a circumferentially extending outer race, an outwardly extending axial flange with outwardly directed anti-rotation projections located radially outwardly from the circumferentially extending outer race, and an inwardly extending flange;
    forming an axial bearing cup with an axial body having ring retention tabs spaced about an inner periphery located in notched sections, and an outer radial flange having radially inwardly directed cage retention tabs;
    installing the radial bearing ring into the axial bearing cup with the anti-rotation projections being located in the notched sections;
    installing a first cage with radial rollers in the radial bearing ring, the radial rollers contacting the circumferentially extending outer race;
    installing an intermediate washer that forms an axial race in the axial bearing cup; and installing a second cage with axial rollers in the axial bearing cup, the axial rollers contacting the intermediate washer, and the second cage being retained by the radially inwardly directed cage retention tabs, and the outwardly directed anti-rotation projections at least partially overlap the axial rollers in a radial direction with respect to an axis of rotation of the radial and axial combination bearing.

2. The method of claim 1, wherein the radial bearing ring and the axial bearing cup are each formed by pressing a sheet metal blank.

3. The method of claim 2, wherein the sheet metal blank is made of bearing grade steel.

4. The method of claim 2, further comprising heat treating and tempering the radial bearing ring and the axial bearing cup.

5. The method of claim 4, further comprising surface polishing the radial bearing ring and the axial bearing cup.

6. The method of claim 1, wherein the axial flange of the radial bearing ring is aligned with the axial body of the axial bearing cup.

7. The method of claim 1, wherein the notched sections include end walls that contact the anti-rotation projections.

8. A radial and axial combination bearing, comprising:
a radial bearing ring having a circumferentially extending race, an outwardly extending axial flange with outwardly directed anti-rotation projections, located radially outwardly from the circumferentially extending outer race, and an inwardly extending flange;
an axial bearing cup with an axial body having ring retention tabs spaced about an inner periphery located in notched sections, and an outer radial flange having radially inwardly directed cage retention tabs;
the radial bearing ring being located in the axial bearing cup with the anti-rotation projections being located in the notched sections;
a first cage with radial rollers located in the radial bearing ring, the radial rollers contact the circumferentially extending race;
an intermediate washer that forms an axial race in the axial bearing cup; and
a second cage with axial rollers located in the axial bearing cup, the axial rollers contact the intermediate washer, and the second cage being retained by the radially inwardly directed cage retention tabs, and the outwardly directed anti-rotation projections at least partially overlap the axial rollers in a radial direction with respect to an axis of rotation of the radial and axial combination bearing.

9. The bearing of claim 8, wherein the radial bearing ring and the axial bearing cup are pressed sheet metal parts.

10. The bearing of claim 8, wherein the axial flange of the radial bearing ring is aligned with the axial body of the axial bearing cup.

11. The bearing of claim 8, wherein the notched sections include end walls that contact the anti-rotation projections.

* * * * *